United States Patent [19]

Bateman

[11] Patent Number: 4,684,948

[45] Date of Patent: Aug. 4, 1987

[54] GROUND PROXIMITY WARNING SYSTEM HAVING MODIFIED TERRAIN CLOSURE RATE WARNING ON GLIDE SLOPE APPROACH

[75] Inventor: Charles D. Bateman, Bellevue, Wash.

[73] Assignee: Sundstrand Data Control, Inc., Redmond, Wash.

[21] Appl. No.: 512,208

[22] Filed: Jul. 8, 1983

[51] Int. Cl.[4] .................. G08B 23/00; G05D 1/06
[52] U.S. Cl. .................. 340/970; 78/178 T; 340/967; 364/433
[58] Field of Search .............. 340/959, 963, 964, 967, 340/970, 973, 976, 977; 73/178 T, 178 R; 364/427–428, 429–430, 433–434; 244/180; 342/65, 120

[56] References Cited

U.S. PATENT DOCUMENTS

| 3,715,718 | 2/1973 | Astengo | 340/27 R |
| 3,925,751 | 12/1975 | Bateman | 340/964 |
| 3,934,221 | 1/1976 | Bateman et al. | 73/178 R |
| 3,934,222 | 1/1976 | Bateman et al. | 73/178 R |
| 3,936,796 | 2/1976 | Bateman | 73/178 T |
| 3,944,968 | 3/1976 | Bateman et al. | 73/178 R |
| 3,946,358 | 3/1976 | Bateman | 340/967 |
| 3,947,809 | 3/1976 | Bateman | 73/178 T |
| 3,958,219 | 5/1976 | Bateman | 340/970 |
| 4,030,065 | 6/1977 | Bateman | 73/178 T |
| 4,433,323 | 2/1984 | Grove | 340/970 |
| 4,567,483 | 1/1986 | Batemen et al. | 340/967 |

Primary Examiner—James L. Rowland
Assistant Examiner—Brent A. Swarthout
Attorney, Agent, or Firm—Mason, Kolehmainen, Rathburn & Wyss

[57] ABSTRACT

An aircraft ground proximity warning system having an excessive terrain closure warning mode and a below glide slope warning mode monitors the glide slope signal and modifies the terrain closure warning envelope to accept a lesser terrain clearance when the aircraft is within the glide slope beam.

19 Claims, 4 Drawing Figures

GROUND PROXIMITY WARNING SYSTEM HAVING MODIFIED TERRAIN CLOSURE RATE WARNING ON GLIDE SLOPE APPROACH

BACKGROUND OF THE INVENTION

1. Field of the Invention

This invention relates generally to ground proximity warning systems, and more particularly to a ground proximity warning system for aircraft of the type that provides warnings including warnings of excessive terrain closure rate and of excessive descent below a glide slope beam wherein the criteria required to generate an excessive terrain closure rate warning are modified when the aircraft is on a glide slope beam to minimize nuisance warnings.

2. Description of the Prior Art

Ground proximity systems, including ground proximity warning systems that provide warnings when the terrain closure rate of an aircraft is excessive and when the aircraft is below a glide slope beam are known. Typical systems that provide a warning when the terrain closure rate is excessive are disclosed in U.S. Pat. Nos. 3,715,718, 3,934,221, 3,934,222, 3,944,968 and 3,958,219. Examples of systems that are responsive to a glide slope radio beam for generating a warning when the aircraft descent excessively below the glide slope are described in U.S. Pat. Nos. 3,925,751 and 3,947,809. An example of a system that provides warnings of various hazardous flight conditions including excessive closure rate and excessive descent below the glide slope is disclosed in U.S. Pat. No. 3,946,358. All of the above-mentioned patents are assigned to the same assignee as the assignee of the present invention, and incorporated herein by reference.

While the devices described in the above-mentioned references do provide satisfactory performance in most situations, there is still a tendency for the excessive terrain closure warning systems to generate false, or nuisance, warnings under certain circumstances, such as on normal ILS approaches to certain airports that are surrounded by mountains, such as, for example, airports at St. Johns, New Foundland, Zurich, Switzerland, Lisbon, Portugal and Madrid, Spain.

Although much effort has been expended in attempting to solve the aforementioned nuisance warning problem, such efforts have centered on modifications of the warning envelope and modifications of the signal processing circuitry, such as modifications to rate limiters and filters designed to prevent the system from generating false warnings on approaches to particular airports. However, no satisfactory solution has been found because such modifications tend to reduce the warning time provided by the system in potentially dangerous situations.

SUMMARY OF THE INVENTION

Accordingly, it is an object of the present invention to provide a ground proximity warning system that overcomes many of the disadvantages of the prior art warning systems.

It is another object of the present invention to provide a ground proximity warning system that substantially reduces the number of nuisance excessive terrain closure warnings that are generated on approaches to landings without reducing the warning times provided by the system during actual excessive terrain closure rate conditions.

It is yet another object of the present invention to provide a ground proximity warning system that monitors the glide slope radio beam and modifies the warning criteria required to generate an excessive closure rate warning when the aircraft is on an ILS approach and is not substantially below the glide slope.

It has been found that in many airports, particularly in those surrounded by mountains, the angle of the ILS glide slope beam is such that a normal approach on the glide slope beam results in closure rates that penetrate the warning envelope of the excessive terrain closure rate warning system, even though the glide slope approach provides sufficient clearance over the terrain to avoid a hazardous flight condition. Thus, as long as the aircraft remains within the glide slope beam, it is on a safe approach, and a highly sensitive excessive terrain closure rate warning system designed to provide warnings during other phases of flight is unnecessary. Consequently, it is possible to desensitize the excessive terrain closure rate warning system as long as the aircraft remains in the glide slope beam without compromising safety.

Therefore, in accordance with a preferred embodiment of the invention, there is provided a ground proximity warning system that has an excessive terrain closure rate warning system that is normally maintained in a sensitive condition of operation to assure maximum warning times under phases of flight other than those when the aircraft is on an approach or a landing under the control of an ILS glide slope beam. The system is further provided with circuitry that detects the presence of the ILS glide slope beam and serves to desensitize the terrain closure rate warning system when the glide slope beam is detected, and the aircraft is not significantly below the glide slope.

DESCRIPTION OF THE DRAWING

These and other objects and advantages of the present invention will become readily apparent upon consideration of the following detailed description and attached drawing wherein.

DETAILED DESCRIPTION OF THE PREFERRED EMBODIMENT

Figure 1:
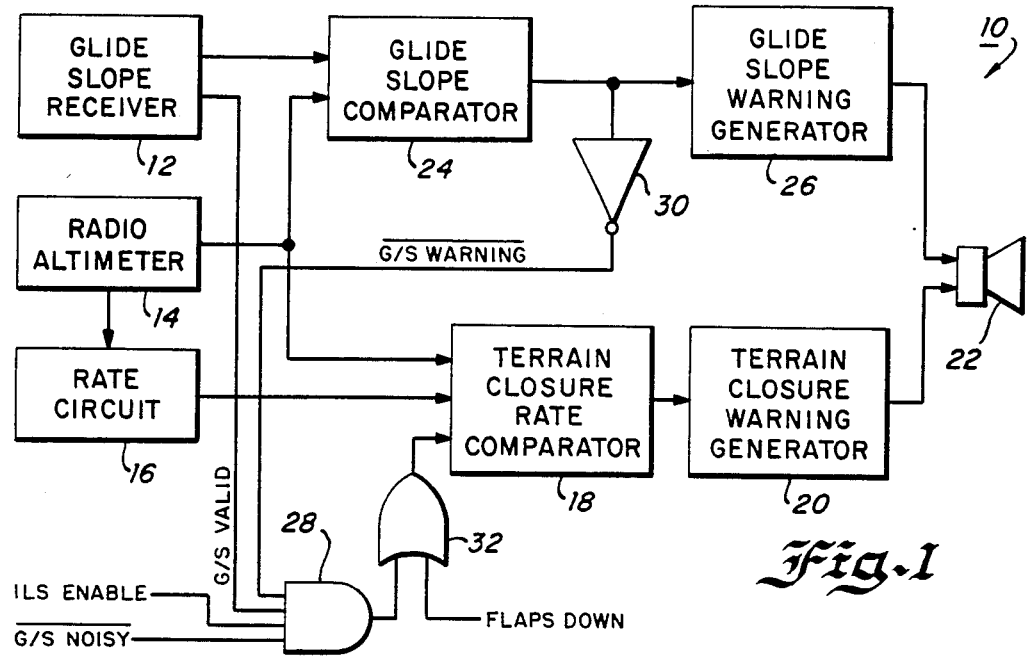
FIG. 1 is a functional block diagram of the ground proximity warning according to the invention.

Referring now to the drawing with particular attention to FIG. 1, there is illustrated a ground proximity warning system according to the invention, generally designated by the reference numeral 10. The system 10 according to the invention is illustrated in FIG. 1 in functional or logical block diagram form as a series of gates, comparators and the like for purposes of illustration; however, it should be understood that the actual implementation of the logic can be other than as shown in FIG. 1, with various digital and analog implementations being possible. The signals used by the warning system as described include signals representative of radio altitude and rate, barometric altitude and rate (not shown in FIG. 1), a signal representative of the deviation of the aircraft from the glide slope beam, and signals indicating the position of the aircraft flaps as well as various validity signals. Because the terrain closure rate may be obtained from the radio altitude rate alone (FIG. 1) or from the radio altitude rate as modified by the barometric altitude rate ($\dot{h}_b$ in the =21 patent), it should be understood that the term closure rate is intended to encompass both a radio altitude closure rate as well as a radio rate modified by a barometric rate signal. Depending upon the type of aircraft in which the warning system is installed, the signals can be obtained from individual instruments such as a glide slope receiver 12 (FIG. 1), a radio altimeter 14, a radio altitude rate circuit 16 and from a discrete circuit element indicating the position of the flaps, or from a digital data bus (not shown) in certain newer aircraft.

The system 10 according to the invention includes a warning system that provides a warning in the event that the terrain closure rate is excessive for the altitude at which the aircraft is flying. To provide this function, there is provided a terrain closure rate comparator 18 that compares the radio altitude rate from the radio altitude rate circuit 16 (and optionally a barometric altitude rate, not shown in FIG. 1) with the altitude above ground as determined by the signal from the radio altimeter 14, and serves to provide a warning initiation signal whenever the terrain closure rate is excessive for the altitude at which the aircrft is flying. The warning initiation signal is applied to a terrain closure rate warning generator 20 which, preferably, provides a voice warning to a transducer 22, either directly or indirectly, in order to provide the pilot of the aircraft with a voice warning indicative of an excessive terrain closure rate condition. A system suitable as the terrain closure rate comparator 18 is illustrated in FIG. 1 of the aforementioned U.S. Pat. No. 3,934,221, which is incorporated by reference.

Figure 2:
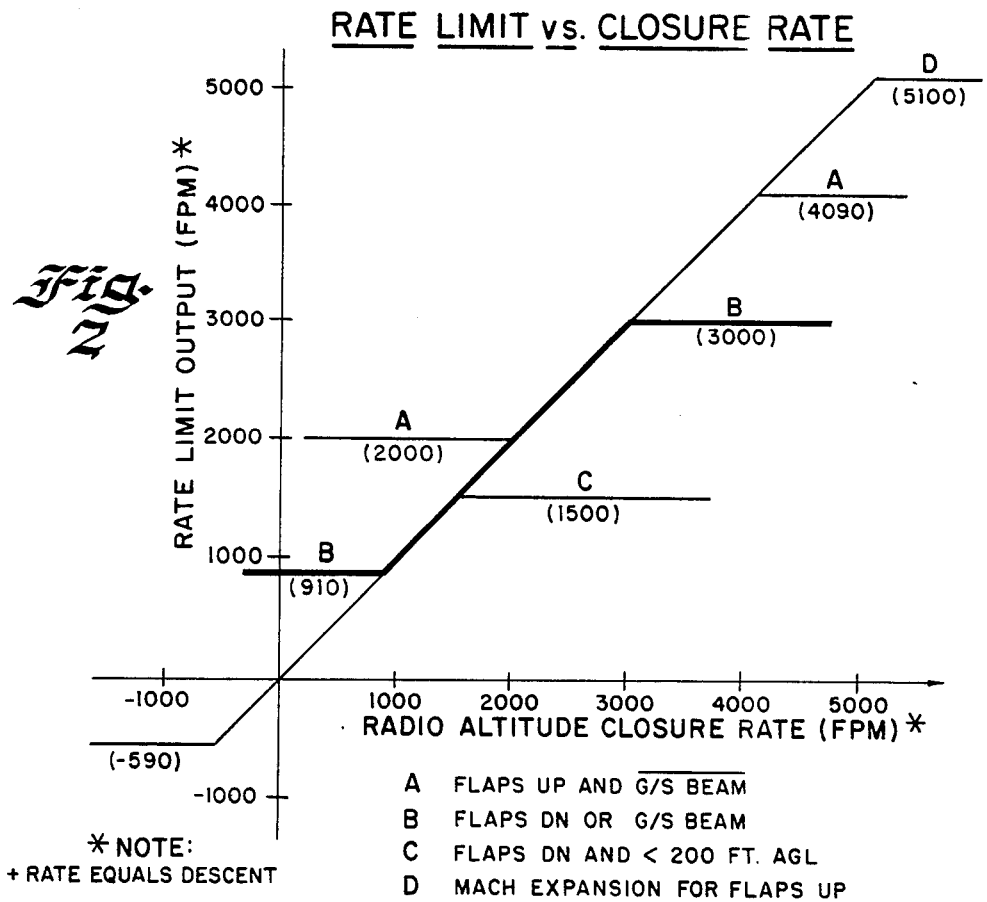
FIG. 2 is a graph illustrating how the excessive closure rate warning criteria may be modified by modifying the rate limiting of the radio altitude rate signal when the aircraft is on the glide slope.

In addition, the system 10 includes a glide slope comparator 24 which compares a signal from the glide slope receiver 12 indicative of glide slope deviation with the signal from the radio altimeter 14 that provides a signal representative of the altitude of the aircraft above ground and generates a glide slope warning initiation signal if the aircraft drops excessively below the glide slope. The glide slope initiation signal is applied to a glide slope warning generator 26 that generates a voice warning indicative of excessive descent below the glide slope to the transducer 22. A suitable system usable as the glide slope comparator 24 is illustrated in FIG. 2 of the previously incorporated by reference U.S. Pat. No. 3,947,809, and serves to provide an advisory warning and a command warning as illustrated in FIG. 1 of the aforesaid '809 patent depending on the degree of deviation below the glide slope.

In accordance with an important feature of the invention, the criteria utilized by the terrain closure rate comparator 18 for generating the warning initiation signal are modified when the aircraft is within the glide slope beam. Thus, there is provided an AND gate 28 that monitors the glide slope receiver 12 to determine whether a valid glide slope signal is being received, and other enabling signals such as an ILS enable signal and a G/S NOISY signal, which is obtained by filtering the glide slope signal, and indicates that the glide slope signal is not noisy. In addition, the gate 28 monitors a signal from the output of the glide slope comparator 24 which is applied thereto via an inverter 30 to provide a NOT G/S WARNING signal to the AND gate 28 which indicates that the aircraft is not excessively below the glide slope. The output of the AND gate 28 is applied to the terrain closure rate comparator 18, conveniently via an OR gate 32 in order to alter the criteria for determining when an excessive terrain closure rate warning should be generated. The criteria is altered whenever a valid glide slope signal is being received, the glide slope signal is not noisy, the ILS is enabled and no glide slope warning is being generated, as indicated by the NOT G/S WARNING signal. The signal from the AND gate 28 to the terrain closure rate comparator 18 (via the OR gate 32) serves to alter the warning criteria required to generate a warning so that the system becomes less sensitive, and reduces the probability of a false warning being generated.

A system suitable as the terrain closure rate comparator 18 is disclosed in FIG. 1 of U.S. Pat. No. 3,934,221, previously incorporated by reference. When utilizing such a system, the output of the OR gate 32 may be applied to the input of the rate limiter 10 designated as FLAPS of FIG. 1 of the aforesaid '221 patent. Thus, when the aircraft is on an approach within the glide slope radio beam, the criteria required to generate a terrain closure rate warning signal are modified from the flaps up configuration illustrated in FIG. 2 of the '221 patent to the criteria illustrated in the flaps down configuration of the '221 patent to thereby effectively inhibit warnings above radio altitudes of approximately 700 to 900 feet, or approximately 789 feet in the system shown in the '221 patent. A signal indicative of a flaps down configuration may also be applied to the OR gate 32 to similarly alter the warning criteria. Moreover, although it is convenient to alter the criteria required to generate a warning initiation signal by the terrain closure rate comparator 18 by simply changing the criteria from the flaps up to the flaps down warning requirements, it should be noted that the criteria may be altered other than that as previously described, and may be optimized to minimize nuisance warnings occuring on approaches to mountains surrounded airports.

One method that has been found to be particularly effective for altering the warning criteria of the excessive terrain closure rate warning mode is to alter the rate limits of the radio altitude rate limiter 10 ('221 patent) as is illustrated in FIG. 2. For example, under normal cruising conditions, when the flaps of the aircraft are up and the aircraft is not on the glide slope beam, the rate limits are as shown in graph A with the rate limiter, for example, the rate limiter 10 of the '221 patent, being set to limit the altitude rate signal to values of, for example, between 2,000 feet per minute and 4,090 feet per minute of descent rate. In the graph of FIG. 2, a positive radio altitude closure rate is considered to be a descent rate.

If however, the flaps of the aircraft are lowered, or if the aircraft is on the glide slope beam, regardless of the position of the flaps, the output of the rate limiter 10 is altered to limit the rate signal to values between, for example, 3,000 feet per minute and 910 feet per minute of descent rate. Also, curves C and D show the modification to the rate limits when the aircraft is below 200 feet above ground level and for the airspeed expansion with the flaps up, respectively. The airspeed expansion, or Mach expansion, increases the sensitivity of the terrain closure rate warning system as a function of airspeed, as is apparent from FIG. 3.

Figure 3:
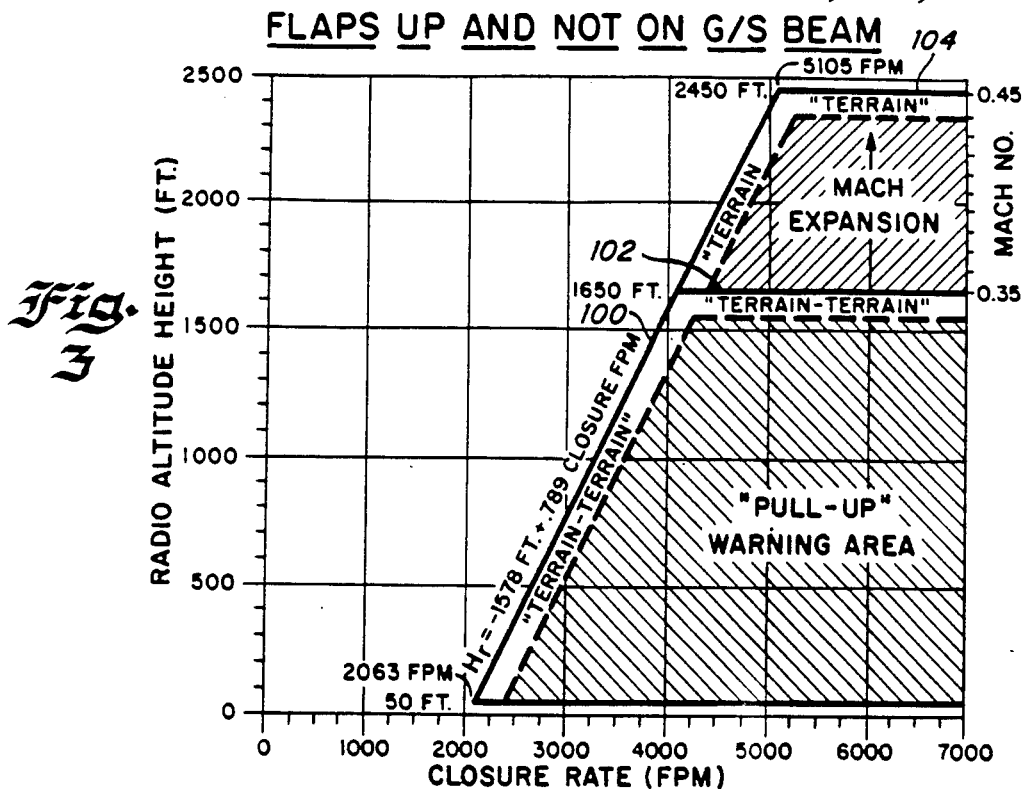
FIGS. 3 and 4 are graphs illustrating how the warning envelopes are modified by modifying the rates as limits shown in FIG. 2.

FIG. 3 illustrates the warning envelope, or criteria necessary to generate an excessive closure rate warning when the aircraft is cruising and its flaps are not up and it is not on the glide slope beam. Under such circumstances, the closure rate warning is given below 1,650 feet when the aircraft is flying at Mach 0.35 or slower if the envelope defined by the lines 100 and 102 is penetrated. In the illustrated embodiment, a voice warning such as "TERRAIN" is enunciated twice, followed by a "PULL UP" warning when the aforesaid envelope is penetrated. Above a speed of Mach 0.35 to a speed of up to Mach 0.45, the warning envelope is expanded to 2,450 feet as is illustrated by the line 104 to provide increased warning times at higher speeds.

Figure 4:
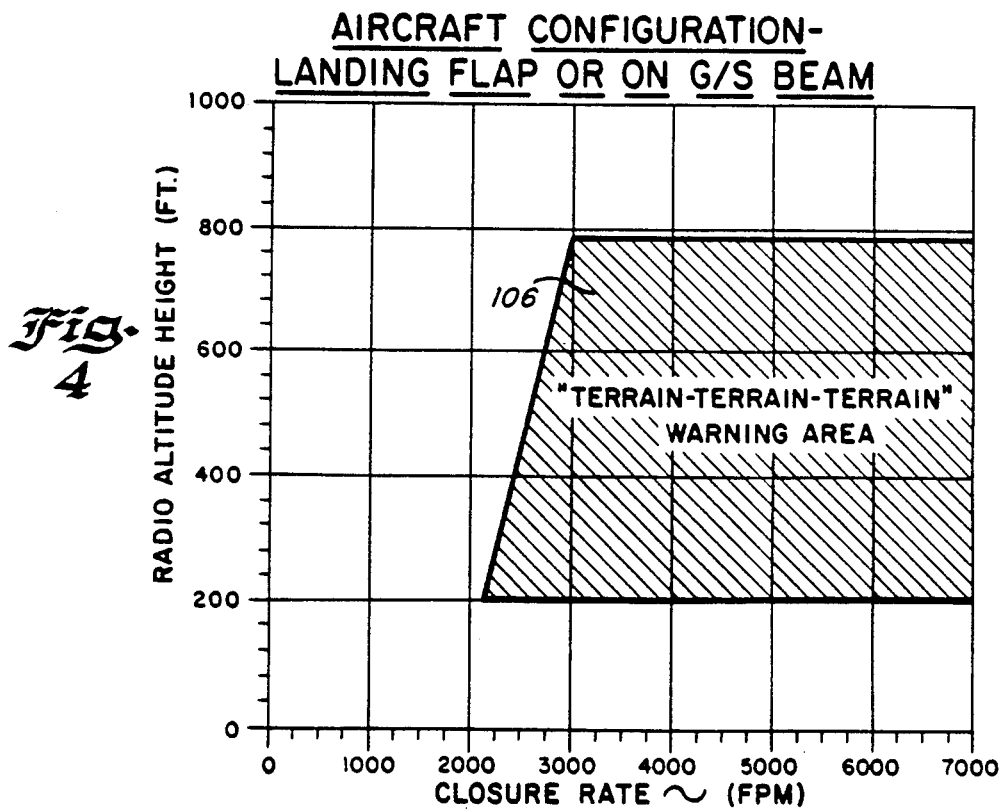

If however, the aircraft is on the glide slope beam, the protection provided by the graph shown in FIG. 3 is unnecessary and may even cause nuisance warnings. Consequently, the system according to the invention is desensitized. If the system is desensitized by altering the rate limits of the limiter 10 ('221 patent), as is illustrated in FIG. 2, the warning envelope illustrated in FIG. 4 results. Thus, when the aircraft is on the glide slope beam (or its flaps are down) a warning, such as a "TERRAIN" voice warning is generated whenever the warning envelope defined by the shaded area 106 of FIG. 4 is penetrated. Thus, by limiting the altitude at which the warning is initiated to no more than approximately 700 to 900 feet above ground level, or 790 feet as is illustrated in FIG. 4, nuisance warnings that occur when on an approach to a landing are eliminated, or at least substantially reduced. The elimination of warnings below altitudes of approximately 200 feet above ground level, as is shown in FIG. 4, also eliminates nuisance warnings when the aircraft is about to touch down.

In addition, it has been found useful to disable the insufficient terrain clearance warning system of the type commonly known as mode 4 B and described in U.S. Pat. Nos. 3,936,796, 3,944,968, and 4,030,065 assigned to the same assignee as the of the assignee of the present invention and incorporated herein by reference. In particular, if the aircraft is within the glide slope beam and the landing gear is down, the mode commonly known as mode 4B described in the afore-mentioned patents, that is the insufficient terrain clearance mode with the landing gear down would be disabled when the landing gear is down and the aircraft is on the glide slope, and not deviating excessively below the glide slope beam.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A ground proximity warning system for an aircraft comprising:
   means responsive to a signal representative of the altitude of the aircraft above ground and to a signal representative of the terrain closure rate of the aircraft for generating a first signal when the terrain closure rate is within a predetermined envelope for the altitude at which the aircraft is flying;
   means responsive to a glid slope radio beam for generating a second signal if the aircraft deviates by more than a predetermined limit from the glide slope; and
   means for altering said predetermined envelope according to a predetermined relationship between the closure rate and the altitude of the aircraft above ground when said glide slope is detected and said aircraft has not deviated more than the predetermined limit from said glide slope.

2. A ground proximity warning system as recited in claim 1 wherein said predetermined envelope is altered to reduce the maximum altitude at which a first signal may be generated when said glide slope beam is detected and the aircraft has not descended more than said predetermined limit below the glide slope.

3. A ground proximity warning system as recited in claim 2 wherein said maximum altitude is reduced to approximately 700 to 900 feet above the ground.

4. A ground proximity warning system as recited in claim 1 wherein said terrain closure rate warning means includes means for limiting the maximum and minimum values of the terrain closure rate signal and means for altering at least one of said maximum and minimum values to alter said predetermined envelope.

5. In a ground proximity warning system having means for warning the pilot of an aircraft of an excessive closure rate with terrain according to a predetermined warning envelope and means for detecting a glide slope beam and the altitude of the aircraft above ground, the improvement comprising, means responsive to said glide slope beam detecting means for altering said predetermined warning envelope according to a predetermined relationship between the closure rate and the altitude of the aircraft above ground when said glide slope beam is detected.

6. The improvement recited in claim 5 wherein said warning envelope altering means includes means for limiting the maximum altitude at which the closure rate warning may be given.

7. The improvement recited in claim 6 wherein said warning envelope altering means includes means for limiting the maximum altitude at which a terrain closure rate warning may be given to approximately 700 to 900 feet above ground.

8. The improvement recited in claim 6 wherein said warning envelope altering means includes means for determining if the aircraft deviates more than a predetermined limit from the glide slope, and for altering said predetermined warning envelope only if the aircraft has not dropped more than said predetermined limit below the glide slope.

9. The improvement recited in claim 5 wherein said warning envelope altering means includes means for altering the maximum closure rate to which the excessive closure rate warning means is responsive.

10. A ground proximity warning system for an aircraft comprising:
    means for receiving a source of signals representative of the altitude of the aircraft above ground;
    means for receiving a glide slope radio beam;
    means for providing a signal representative of the terrain closure rate of the aircraft;
    means responsive to the altitude of the aircraft above ground signal receiving means and to the terrain closure rate signal providing means for generating a warning if the terrain closure rate is within a predetermined warning envelope for the altitude at which the aircraft is flying;
    means responsive to the glide slope signal receiving means for generating a warning if the aircraft deviates more than a predetermined limit from the glide slope; and means for altering said predetermined warning envelope according to a predetermined relationship between the terrain closure rate and the altitude of the aircraft above ground when said glide slope beam is received and said aircraft has not deviated more than said predetermined limit from said glide slope.

11. A ground proximity warning system as recited in claim 10 wherein said excessive deviation from said glide slope warning generating means is further responsive to the altitude above ground of the aircraft and generates the warning if the aircraft deviates excessively below the glide slope for the altitude at which the aircraft is flying.

12. A ground proximity warning system as recited in claim 9 wherein said predetermined warning envelope is altered to reduce the maximum altitude at which a warning may be generated when said glide slope beam is detected and the aircraft has not descended more than said predetermined limit below the glide slope.

13. A ground proximity warning system as recited in claim 12 wherein said maximum altitude is reduced to approximately 700 to 900 feet above the ground.

14. A ground proximity warning system as recited in claim 9 wherein said terrain closure rate warning means includes means for limiting the maximum and minimum values of the terrain closure rate signal and means for altering at least one of said maximum and minimum values to alter said predetermined warning envelope.

15. A ground proximity warning system as recited in claim 9 wherein said predetermined warning envelope is altered to increase the minimum altitude at which a warning will be generated when said glide slope beam is detected and the aircraft has not descended by more than said predetermined limit below the glide slope.

16. A ground proximity warning system for an aircraft comprising:
    means for receiving a source of signals representative of the altitude of the aircraft above ground;
    means for receiving a source of signals representative of the glide slope;
    means for providing a signal representative of the terrain closure rate of the aircraft;
    means responsive to the altitude of the aircraft above ground signal receiving means and to the terrain closure rate signal providing means for generating a warning if the terrain closure rate is within a predetermined warning envelope for the altitude at which the aircraft is flying; and
    means responsive to said glide slope signal for altering said warning envelope according to a predetermined relationship between the terrain closure rate and altitude of the aircraft above ground when said glide slope signal has not deviated by more than a predetermined limit from said glide slope.

17. A ground proximity warning system as recited in claim 16 wherein said predetermined warning envelope is altered to reduce the maximum altitude at which a warning may be generated when said flap position signal indicates the aircraft is in a landing mode.

18. A ground proximity warning system as recited in claim 16 wherein said predetermined warning envelope is altered to increase the minimum altitude at which a warning will be generated when said flap position signal indicates the aircraft is in a landing mode.

19. A ground proximity warning system for an aircraft as recited in claim 16 further including means for providing a signal representative of the flap position of the aircraft; and
    means responsive to said aircraft flap position signal providing means for altering the warning envelope as a function of closure rate and altitude of the aircraft above ground when said flap position signal indicates the aircraft is in a landing mode.

* * * * *